United States Patent

[11] 3,584,975

| [72] | Inventor | Edwin H. Frohbieter<br>Stevensville, Mich. |
|---|---|---|
| [21] | Appl. No. | 872,128 |
| [22] | Filed | Oct. 29, 1969 |
| [45] | Patented | June 15, 1971 |
| [73] | Assignee | Whirlpool Corporation |

[54] MAGNETIC DRIVE FOR A SOLUTION PUMP FOR ABSORPTION AIR CONDITIONER
4 Claims, 2 Drawing Figs.

| [52] | U.S. Cl. | 417/420, |
|---|---|---|
| | | 417/203, 310/104 |
| [51] | Int. Cl. | F16d 27/01 |
| [50] | Field of Search | 417/420; |
| | | 192/84 PM; 310/104 |

[56] References Cited
UNITED STATES PATENTS

| 2,366,562 | 1/1945 | Schug | 417/420 |
|---|---|---|---|
| 2,373,609 | 4/1945 | Staht | 310/104 |
| 3,085,407 | 4/1963 | Tomlinson | 192/84 PM |

Primary Examiner—Carlton R. Croyle
Assistant Examiner—R. E. Gluck
Attorneys—James S. Nettleton, Thomas E. Turcotte, Burton H. Baker, Gene A. Heth, Franklin C. Harter, Anthony Niewyk, Robert L. Judd and Hofgren, Wegner, Allen, Stellman & McCord ABSTRACT: A magnetic drive for a fluid pump particularly adapted to pump a refrigerant solution in which the liquid circuit includes a casing for the pump and the drive including a rotatable block of magnetically hard metal such as ALNICO positioned adjacent to and exteriorly of the casing. A rotatable permanent first magnet is positioned exteriorly of the casing but adjacent the hard metal to provide a hysteresis coupling between the magnetically hard material and the first magnet. A rotatable permanent second magnet inside the casing is spaced from the first magnet to provide a synchronous coupling between the first and second magnets. Movable pump-operating means are attached to the second magnet for providing a fluid-pumping action on rotation of the second magnet. Drive means are provided for rotating the magnetically hard metal, thereby rotating said first magnet by reason of the hysteresis coupling and the second magnet by reason of the synchronous coupling between the two magnets. With this arrangement the magnetically hard metal and the first magnet may be located very close to each other for maximum strength of their coupling, while the two permanent magnets may be spaced further apart so that one may be located on the interior of the pump casing and the other on the exterior.

PATENTED JUN 15 1971

3,584,975

INVENTOR
EDWIN H. FROHBIETER
BY Holgren, Wegner, Allen,
Stellman & McCord
ATTORNEY

MAGNETIC DRIVE FOR A SOLUTION PUMP FOR ABSORPTION AIR CONDITIONER

The pump itself which is disclosed herein is the subject of my copending application, Ser. No. 872,129, filed Oct. 29, 1970, assigned to the same assignee as the present application.

One of the features of this invention is to provide a magnetic drive for a fluid pump such as for a liquid refrigerant in a high-pressure absorption refrigeration system in which the drive for the pump is provided by a magnetic structure and with the magnetic drive including a magnetically hard metal closely adjacent a first permanent magnet and rotatable to rotate this first magnet through a hysteresis coupling and a rotatable second permanent magnet spaced from the first magnet and rotatable thereby because of a synchronous coupling therebetween.

Other features and advantages of the invention will be apparent from the one embodiment shown in the accompanying drawings, of which:

Figure 2:
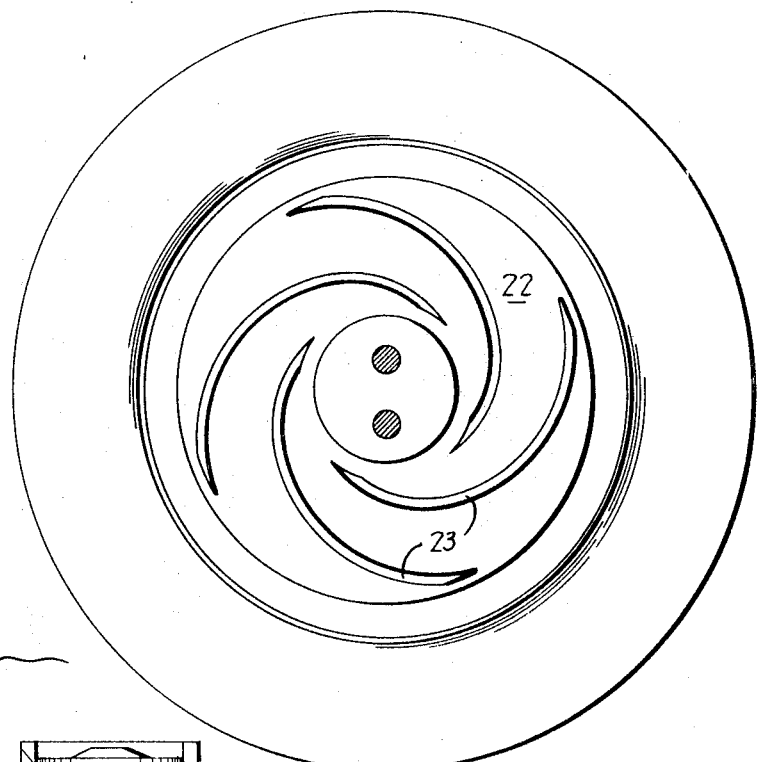
FIG. 2 is a horizontal sectional view taken substantially along line 2-2 of FIG. 1.

In the illustrated embodiment a pump 10 comprises a casing 11 having a bottom 12 beneath which is positioned a hysteresis member which comprises an annular block 13 of magnetically hard material such as ALNICO. This ring-shaped block 13 is positioned closely adjacent the bottom 12 of the casing and is held in an annular holder 14 of nonmagnetic material such as brass, stainless steel or the like.

Located closely adjacent the bottom surface of the annular block 13 is an annular first permanent magnet 15 that is mounted on and movable with a ring-shaped platform 16 that is also nonmagnetic.

The holder 14 for the hysteresis member 13 is attached to a rotatable shaft 17 by a setscrew 18. The shaft 17 may be driven by an electric motor (not shown). Located within the bottom 12 of the casing, which is constructed of a nonmagnetic material such as stainless steel, is a permanent second magnet 19 of circular configuration with the block 13, holder 14, first magnet 15, platform 16, shaft 17 and second magnet 19 all being coaxial.

The first magnet 15 and its supporting platform 16 are rotatable together on a ball bearing structure 20 that surrounds an axial extension 21 of the drive shaft 17.

The permanent second magnet 19 within the casing 11 is mounted on a top plate 22 which carries a plurality of spaced curved vanes 23 to provide a centrifugal pump.

Extending upwardly from the plate 22 is a pump shaft 24 that is provided with an eccentric slider block 25. Upon rotation of the shaft 24 the block 25 reciprocates in its pump cavity 26 and in so doing reciprocates a piston 27 that is mounted in a piston cylinder 28 formed in a lateral extension 29 to the pump body 30.

Figure 1:
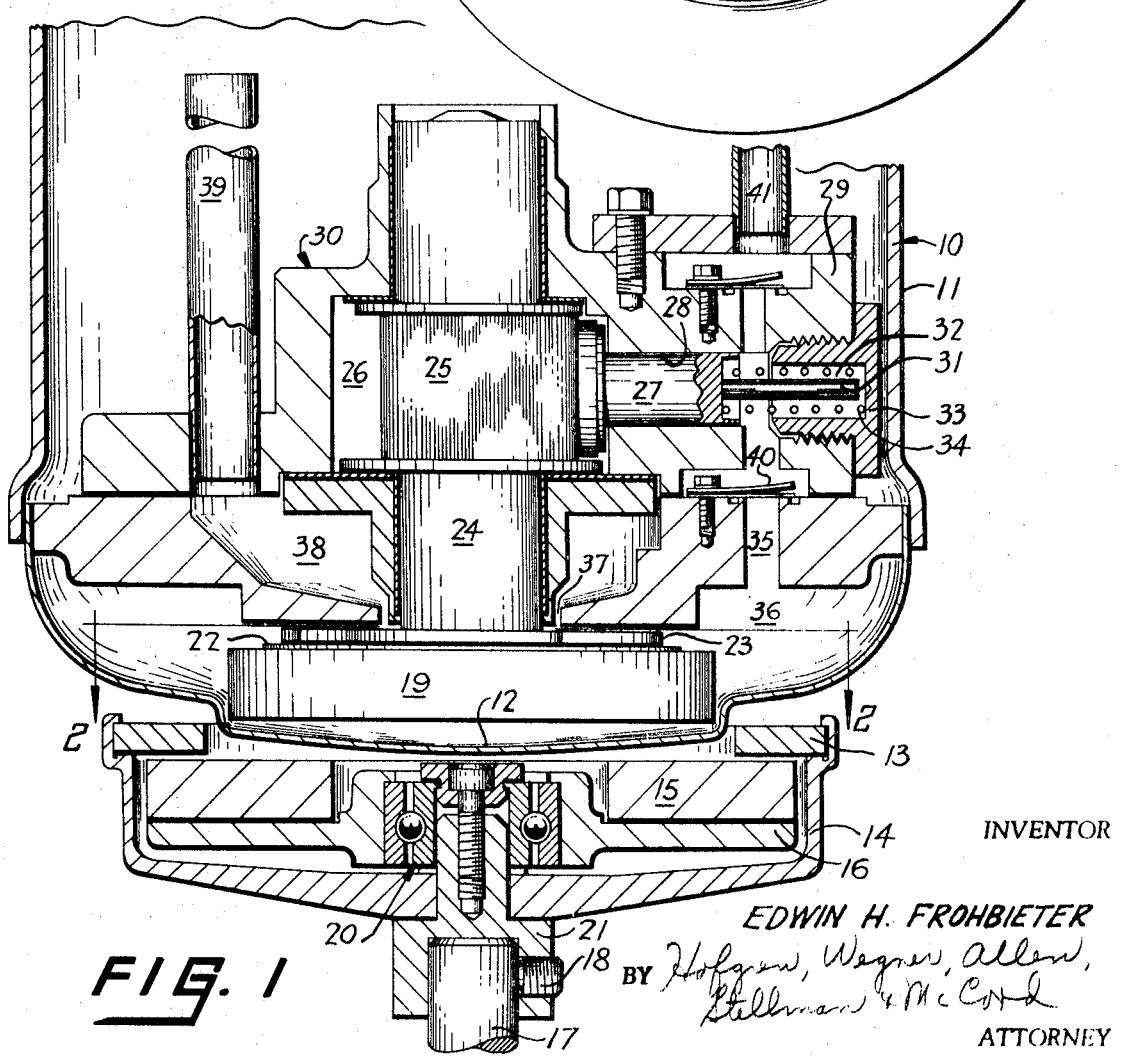
FIG. 1 is a vertical sectional view through a bottom portion of a pump for an absorption refrigeration liquid.

The piston 27 which is arranged generally horizontally has a smaller outward extension 31 thereon which extends into a cylindrical cavity 32 in a screwplug 33. This cavity 32 carries a helical compression spring 35 one end of which bears against the outer end of the piston 27. During movement of the slider block 25 the piston 27 reciprocates in its horizontal path. On the inward movement of the piston, or to the left as shown in FIG. 1, the pump applies suction by way of passage 35 to refrigerant liquid such as ammonia dissolved in water that is held in the bottom of the casing 11 and which fills the vertical passage 35 as well as the bottom reservoir 36. This reservoir 36 of course has the centrifugal pump formed by plate 22 and vanes 23 immersed therein and liquid is supplied to the pump by way of an annular passage 37 just above the inner ends of the pump vanes 23. This passage 37 leads from an annular chamber 38 that is around the lower end of the vertical pump shaft 24 and that is supplied with liquid from the interior of the casing 11 by way of a standpipe 39.

On the suction stroke of the piston 27, or movement to the left, the resulting suction draws liquid upwardly in the passage 35 past the flexible one-way valve 40 which permits the flow only in the upward direction. Then, on the reverse movement of the piston 27 the pressure above the valve 40 forces it closed and forces liquid under pressure from the pump into the high-pressure portion of the refrigeration system (not shown) as indicated by the discharge liquid flow line 41.

The magnetic drive of this invention provides an efficient pumping action with only a magnetic coupling between the drive parts and the driven parts. The combination of the first permanent magnet 15 and the closely adjacent driven magnetically hard block 13 provides an efficient magnetic drive coupling that can accommodate slippage. Thus the torque-transmitting ability is maintained even though the coupling may slip because of torque surge or an excessive load on the coupling.

The combination of the first 15 and second 19 permanent magnets which necessarily must be widely spaced apart as illustrated with one being outside the pump casing and the other on the inside provides a synchronous coupling that will transmit the necessary pump-driving torque even over such a wide space. The magnetic coupling of this invention therefore which uses a combination of the closely spaced hysteresis coupling and the widely spaced synchronous coupling is ideally suited for the drive of a solution pump as illustrated.

In the magnetic drive of this invention the hysteresis coupling between the magnetically hard metal and the first magnet has sufficient torque to drive the pump 10 in the manner described above. This torque, however, is insufficient to break the synchronous coupling between the spaced permanent magnets even when the pump is under heavy load such as occurs at startup under a high-pressure head at the outlet of the pump.

Having described my invention as related to the embodiment shown in the accompanying drawings, it is my intention that the invention be not limited by any of the details of description, unless otherwise specified.

I claim:

1. A magnetic drive for a fluid pump within a fluid-containing casing comprising: a rotatable block of magnetically hard metal adjacent to and exteriorly of said casing; a rotatable permanent first magnet adjacent said hard metal providing a hysteresis coupling between said metal and first magnet; a rotatable permanent second magnet inside said casing spaced from said first magnet providing a synchronous coupling therebetween; movable pump-operating means operatively attached to said second magnet for providing a fluid-pumping action on rotation of said second magnet; and means for rotating said magnetically hard metal, thereby rotating said first magnet by reason of said hysteresis coupling and said second magnet by reason of said synchronous coupling to operate said pump.

2. The magnetic drive of claim 1 wherein said pump is in a refrigeration system and said fluid comprises a liquid refrigerant.

3. The magnetic drive of claim 2 wherein said hard metal block and first and second magnets are circular and coaxial with each other.

4. The magnetic drive of claim 3 wherein said hard metal and magnets are coaxial with said means for rotating.